(12) United States Patent
Pudhey et al.

(10) Patent No.: US 8,611,897 B2
(45) Date of Patent: Dec. 17, 2013

(54) FALLBACK BETWEEN RADIO ACCESS TECHNOLOGIES

(75) Inventors: Christopher Pudhey, Newbury (GB); Adrian Neal, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 13/163,403

(22) Filed: Jun. 17, 2011

(65) Prior Publication Data

US 2012/0015650 A1  Jan. 19, 2012

(30) Foreign Application Priority Data

Jun. 17, 2010 (GB) .................................. 1010186.3

(51) Int. Cl.
*H04W 4/00* (2009.01)

(52) U.S. Cl.
USPC ..... 455/434; 455/456.1; 455/515; 455/435.2; 455/432.1; 370/338

(58) Field of Classification Search
USPC .............. 455/434, 428, 429, 435.2, 438, 464, 455/515, 432.1, 456.1; 370/338
See application file for complete search history.

(56) References Cited

U.S. PATENT DOCUMENTS

| | | | |
|---|---|---|---|
| 7,778,653 B2 * | 8/2010 | Narasimha ..................... | 455/458 |
| 8,000,706 B2 * | 8/2011 | Lee et al. .................... | 455/435.2 |
| 8,213,957 B2 * | 7/2012 | Bull et al. .................. | 455/456.1 |
| 2006/0030334 A1 * | 2/2006 | Hashimoto ................ | 455/456.1 |
| 2006/0084443 A1 * | 4/2006 | Yeo et al. ....................... | 455/449 |
| 2006/0276202 A1 * | 12/2006 | Moeglein et al. .......... | 455/456.1 |
| 2007/0097939 A1 | 5/2007 | Nylander et al. | |
| 2007/0293222 A1 * | 12/2007 | Vikberg et al. ............... | 455/436 |
| 2008/0242298 A1 * | 10/2008 | Nylander et al. .......... | 455/435.2 |
| 2008/0254812 A1 * | 10/2008 | Kitazoe ...................... | 455/456.2 |
| 2009/0061877 A1 * | 3/2009 | Gallagher et al. ............ | 455/436 |

(Continued)

FOREIGN PATENT DOCUMENTS

| | | | | |
|---|---|---|---|---|
| EP | 2112846 | 10/2009 | | |
| TW | EP2521395 A2 * | 9/2009 | ............ | H04W 28/06 |

(Continued)

OTHER PUBLICATIONS

3GPP TSG SA WG2 Meeting #7 TS S2-100550 (Jan. 18-22, 2010, Shenzhen, China).*

(Continued)

*Primary Examiner* — Kamran Afshar
*Assistant Examiner* — Mong-Thuy Tran
(74) *Attorney, Agent, or Firm* — Workman Nydegger

(57) ABSTRACT

A method for assigning a location area to a mobile device for use in circuit switched fallback from a first radio access network to a second radio access network. Two counters are implemented at the eNode B—a first counter to count the numbers of times a mobile reports a given last-used location area code and a second counter for counting the numbers of certain unique combinations of location area code and further identifying data. Whenever the eNode B receives a signal incorporating a location area code, checking the respective first counter for that code and conditionally incrementing the first counter such that if the first counter is below a predefined threshold the first counter is incremented. If the first counter is equal to the threshold, obtaining further identifying data in addition to the location area code and incrementing the corresponding second counter.

14 Claims, 3 Drawing Sheets

(56) References Cited

U.S. PATENT DOCUMENTS

| | | |
|---|---|---|
| 2009/0075660 A1* | 3/2009 | Hallenstal et al. ............ 455/437 |
| 2009/0253421 A1 | 10/2009 | Camp, Jr. et al. |
| 2010/0003980 A1* | 1/2010 | Rune et al. .................... 455/436 |
| 2010/0022242 A1* | 1/2010 | Nizri et al. ................. 455/435.2 |
| 2010/0041365 A1* | 2/2010 | Lott et al. ...................... 455/406 |
| 2010/0113024 A1* | 5/2010 | Wu ................................ 455/436 |
| 2010/0120438 A1 | 5/2010 | Kone et al. |
| 2010/0172336 A1* | 7/2010 | Pehrsson et al. ............. 370/338 |
| 2010/0189035 A1* | 7/2010 | Pehrsson et al. ............. 370/328 |
| 2010/0195616 A1* | 8/2010 | Vikberg et al. .............. 370/331 |
| 2010/0273504 A1* | 10/2010 | Bull et al. ................. 455/456.1 |
| 2010/0285816 A1* | 11/2010 | Vos et al. .................. 455/456.1 |
| 2010/0303007 A1* | 12/2010 | Witzel et al. ................. 370/328 |
| 2010/0303041 A1* | 12/2010 | Diachina et al. ............. 370/331 |
| 2010/0304749 A1* | 12/2010 | Dwyer et al. ................. 455/443 |
| 2010/0317348 A1* | 12/2010 | Burbidge et al. ............. 455/436 |
| 2010/0331011 A1* | 12/2010 | Vikberg et al. ............ 455/456.1 |
| 2011/0013587 A1* | 1/2011 | Serravalle .................... 370/331 |
| 2011/0026503 A1* | 2/2011 | Mueck et al. ................ 370/338 |
| 2011/0034179 A1* | 2/2011 | David et al. ................ 455/456.1 |
| 2011/0105153 A1* | 5/2011 | Miklos et al. .............. 455/456.5 |
| 2011/0143755 A1* | 6/2011 | Islam et al. ................... 455/434 |
| 2011/0149852 A1* | 6/2011 | Olsson et al. ................ 370/328 |
| 2011/0201342 A1* | 8/2011 | Wong et al. .................... 455/450 |
| 2011/0238751 A1* | 9/2011 | Belimpasakis et al. ........ 709/204 |
| 2011/0244869 A1* | 10/2011 | Olofsson et al. .............. 455/442 |
| 2011/0268083 A1* | 11/2011 | Ostrup et al. ................. 370/331 |
| 2011/0300866 A1* | 12/2011 | Ali et al. ....................... 455/436 |
| 2012/0003974 A1* | 1/2012 | Nylander et al. .......... 455/435.2 |
| 2012/0014267 A1* | 1/2012 | Gomes et al. ................. 370/252 |
| 2012/0028661 A1* | 2/2012 | Fang et al. .................... 455/466 |
| 2012/0106370 A1* | 5/2012 | Radulescu et al. ............ 370/252 |
| 2012/0202500 A1* | 8/2012 | Wu ................................ 455/436 |
| 2012/0236751 A1* | 9/2012 | Lee et al. ...................... 370/252 |
| 2013/0072182 A1* | 3/2013 | Jung et al. .................. 455/422.1 |

FOREIGN PATENT DOCUMENTS

| | | |
|---|---|---|
| WO | WO 2007/113457 A1 * | 2/2007 |
| WO | WO 2008/054668 A2 * | 10/2007 |
| WO | WO 2010/083659 A1 * | 1/2009 |

OTHER PUBLICATIONS

3GPP TS 36.300 V8.7.0, (Jan. 2009, France) Chapter 22 from pp. 111-117.*

ES 201030831, Mar. 15, 2012, Spanish Search Report.

* cited by examiner

FALLBACK BETWEEN RADIO ACCESS TECHNOLOGIES

CROSS-REFERENCE TO RELATED APPLICATIONS

This Application claims priority to and the benefit of United Kingdom Patent Application No. GB 1010186.3, filed Jun. 17, 2010, which is incorporated herein by reference in its entirety.

FIELD OF THE INVENTION

The invention relates to a method for facilitating graceful fallback from a first radio access network (RAN) to a second RAN. In particular, the invention relates to a method for more reliably identifying the Location Area (LA) of a user equipment (UE) in the second RAN.

BACKGROUND TO THE INVENTION

Mobile Circuit Switched (CS) services supported by on GSM/EDGE Radio Access Network (GERAN) and Universal Terrestrial Radio Access Network (UTRAN) are used throughout the world. They allow a user to obtain telecommunication services with a single user subscription in many countries around the world. The number of CS subscribers continues to grow rapidly, boosted by the expansion of mobile CS services in countries with high populations such as India and China.

A Third Generation Partnership Project (3GPP) work item, "Evolved UTRA and UTRAN", defines Long-Term Evolution (LTE), designed to improve efficiency, lower costs and improve services for 3GPP-based access technology. LTE uses Orthogonal Frequency-Division Multiplexing (OFDM) radio technology in the downlink and Single Carrier Frequency Division Multiple Access (SC-FDMA) for the uplink, allowing at least 100 Mbps peak data rate for downlink data rate and 50 Mbps for uplink data rate.

In addition to the Radio Access Network (RAN) standardization, a 3GPP System Architecture Evolution (SAE) work item has been to develop an evolved core network (CN) for LTE networks—referred to as the Evolved Packet Core (EPC) or simply SAE Core. The SAE core network is made up of core nodes, which may be further split into Control Plane (Mobility Management Entity, MME) nodes and User Plane Gateway (Serving Gateway and PDN Gateway) nodes.

LTE and SAE only support Packet Switched (PS) data transport, and so all services must be supported via a PS domain. However, existing GERAN and UTRAN provide both PS and CS access and services, and so for telephony services to be deployed over LTE radio access, an IMS-based service engine is required. There are several interim solutions to allow LTE/SAE access to CS domain services normally available via GERAN and UTRAN but these require the network to either support "CS over SAE/LTE" or sending the UE to one of the CS supporting Radio Access Technology (RAT). The solution focused in this invention is the later, specifically, the Circuit Switched Fallback solution "Fallback" is the term used in the field of mobile telecommunications to describe the transfer of UEs, sometimes referred to as a "mobiles" or "terminals" in this document, in active mode from a "higher" radio access technology (RAT) (such as LTE) to a "lower" RAT (such as GSM or UMTS). In this sense, fall back is intrinsically "inter-RAT".

Circuit Switched Fallback (CSFB), then, is a technique which allows the UE, normally camped on LTE for Packet Switched (PS) services, to make a Circuit Switched (CS) type call on a CS supporting Radio Access Technology (e.g. UTRAN or GERAN) providing overlaying coverage to the UE.

The eNodeB can use different methods to transfer the call from LTE to a CS supporting RAT. For CSFB to GERAN or UTRAN supported techniques in 3GPP include:
1) PS Handover (applicable to both UTRAN and GERAN)
2) Cell Change Order (CCO) with/without Network Assisted Cell Change (NACC) (only applicable for GERAN)
3) Release with Redirection with redirected carrier information (applicable to both UTRAN and GERAN)

The main discriminating factors between the different options for CSFB include the complexity of implementation and more importantly, the delay incurred in using the procedure.

Upon fallback from E-UTRAN (i.e. the LTE network) to Circuit Switched (e.g. GSM or UMTS voice networks) when moving out of E-UTRAN coverage the UE is required to re-measure the GSM radio environment in order to discover the correct Location Area, interrupting the call. This adds >400 ms of call setup delay which degrades the user experience.

To address this, it is known, from the Applicant's written contribution to the 3GPP TSG SA WG2 Meeting #77 (18-22 Jan. 2010) S2-100550, "Minimising Location Updates during CS Fall Back", filed as a provisional UK patent application GB1000456.2 on 12 Jan. 2010, that for CS FallBack (CSFB) it is useful to align the tracking area boundaries with the location area boundaries of the "target RAT".

Section 4.2 of the S2-100550 written contribution describes the use of location code counters within the eNodeB to aid this process. However, the implementation of these counters itself poses new problems.

It is useful, at this point, to explain a few of the abbreviations and acronyms used to describe location codes in 3GPP Standards: 3GPP TS 23.003 defines the Location Area Code (LAC) as a fixed length code (of 2 octets) identifying a location area within a public land mobile network (PLMN). This is part of the Location Area Identification (LAI) information element that can be coded using a full hexadecimal representation except for the reserved hexadecimal values 0000 and FFFE. This equates to 65,534 values which the network operator can assign.

The LAI is itself composed of the LAC plus the Mobile Country Code (MCC) and Mobile Network Code (MNC).

The S2-100550 written contribution, more precisely then, suggests that the eNodeB (eNB) could maintain location code counters for the most frequently received LAIs.

The eNodeB can determine the identities of Location Areas previously encountered by E-UTRAN attached UEs in any E-UTRAN cell. When each UE attached to E-UTRAN performs a Tracking Area Update the LAC is transferred to the eNodeB as part of the LAI within the Routeing Area ID (RAI)—which is itself within the Globally Unique MME Identifier (GUMMEI). If the LACs are collected over a suitable time period (e.g. up to and including 24 hours), and collated as a table of frequency of occurrence versus each of the 65,534 allowed LACs, the most likely Location Area that overlaps the E-UTRAN cell can be determined, as this will be the most frequent.

The new problem posed by this suggestion in the S2-100550 written contribution arises because an eNodeB does not know how many location areas may be indicated by the UEs performing inter-RAT Tracking Area Updates/Attaches. This can be particularly problematic at borders/airports where large numbers of different 'last visited LAIs' can be received within the RRC signalling messages from the different mobiles. In addition, it is important that the eNodeB counters react swiftly to any changes of the underlying 2G/3G coverage/cell/LA planning/configuration (e.g. if the 2G LA boundary is moved, then the hourly statistics from the eNodeB should reflect this.)

In other words, in E-UTRAN cells containing relatively high proportions of inbound roamers from other countries, or where network sharing or national roaming is allowed, LACs identical to some allocated in the serving network may be encountered, but these will have been assigned by a mobile network in a different country, or by a different mobile network in the same country as the serving network. Thus the LAC may be the same, but the MCC and/or MCC parts of the LAI will differ.

This leads to the likelihood that the eNodeB needs to dimension software/hardware resources for one counter for each Location Area.

However, there are up to 216 Location Areas per network, and, the need to accommodate some national roaming scenarios (where one PLMN is effectively using more than one MNC) and "trans border operator groups" means that the eNodeB might need one location code counter for every LAI—e.g. for up to (1 million*216) (as MNC and MCC are both potentially 3 digit numbers). This amounts to an excessive number of counters!

An object of the invention is to address or at least mitigate the abovementioned problems.

SUMMARY OF THE INVENTION

In accordance with the invention there is provided a method for assigning a location area to a mobile device in fallback from a first radio access network to a second radio access network, the first radio access network including at least a base station node, the method comprises:
  providing a respective first counter for each location area corresponding to the second radio access network, said location area having a corresponding code (LAC);
  whenever the base station node receives a signal incorporating a location area code, checking the respective first counter for that code and conditionally incrementing the first counter such that if the first counter is below a predefined threshold the counter is incremented;
  if the first counter is equal to the threshold, examining the signal, the signal including the LAC and further identifying data, checking whether a second counter exists for the signal as identified by the combination of LAC and further identifying data;
  if the second counter does not exist, providing a second counter for the signal and otherwise incrementing the second counter; and
  reporting, at predetermined intervals, a subset of the second counters to the first radio access network, said subset representing the second counters having the highest counts over the preceding reporting period.

The invention thus entails the ongoing execution of a measurement that pre-determines the most appropriate LA from information already available (i.e. provided in the RRC Connection Release message), such that the UE can fall back to it without significant delay, preserving the quality of the user experience.

As a result, the UE can efficiently determine which Location Area to fall back to when moving out of E-UTRAN coverage and onto GSM during an ongoing speech call, thereby reducing the time taken for fallback and substantially avoiding degradation in user experience.

The invention leads to a scalable implementation of the eNodeB counters described in the S2-100550 written contribution for the determination of most likely Location Area of the target RAT overlapping with an E-UTRAN cell.

DESCRIPTION OF THE DRAWINGS

For a better understanding of the present invention, reference will now be made, by way of example only, to the accompanying drawings in which.

DETAILED DESCRIPTION

Figure 1:
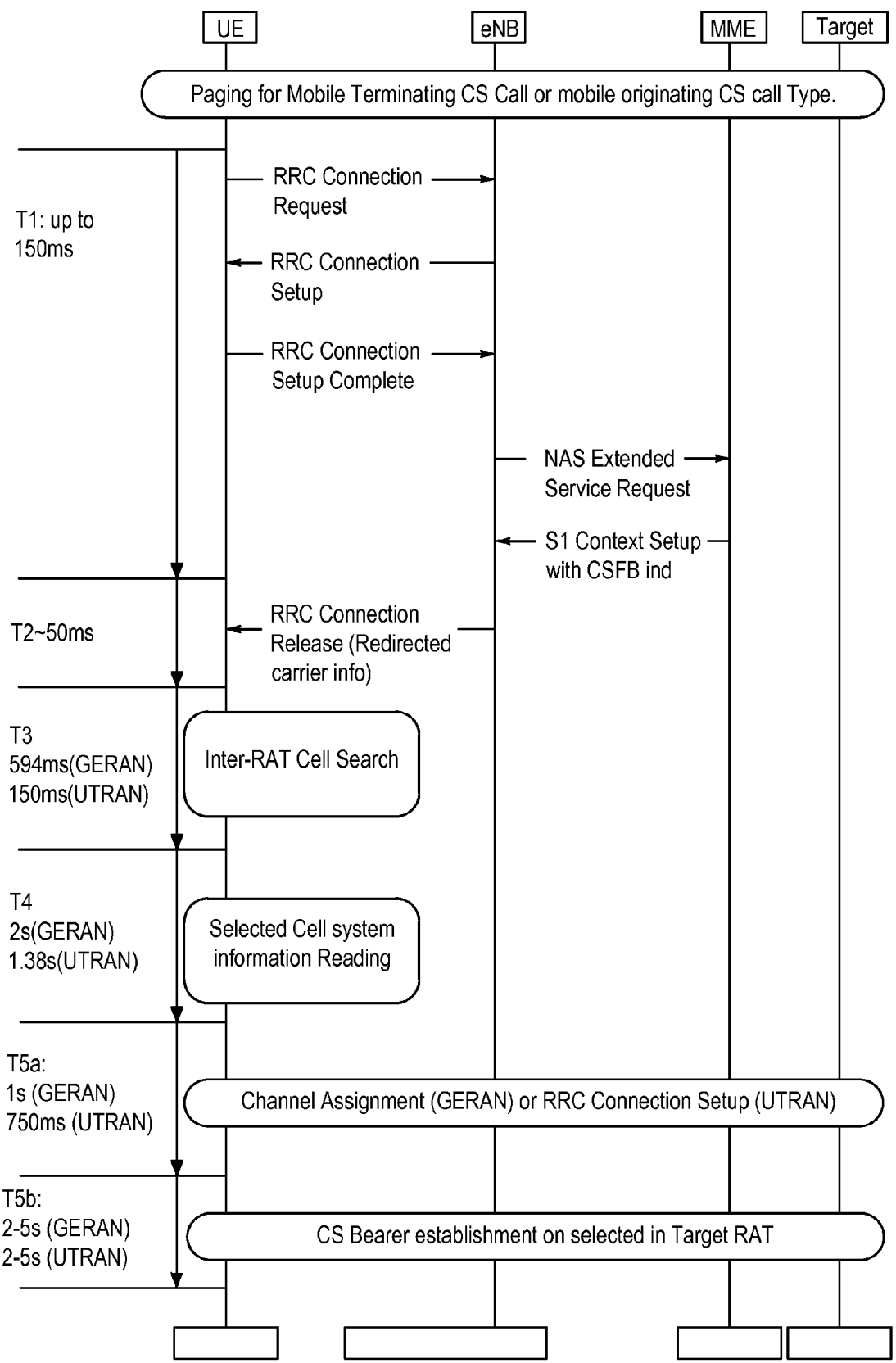
FIG. 1 is a message flow diagram of the prior art CSFB procedure with illustration of expected delays for CSFB to GERAN.

The following is a description of the 3GPP Release 8 procedure for CSFB based on RRC Connection Release with Redirection. The basic procedure for CSFB consists of the following steps:

1. While the UE is camped on to an LTE cell and in the case of a mobile terminated (MT) call, the UE is first sent a paging message by the LTE Mobility Management Entity (MME) indicating CS paging. The UE then sends an Extended Service Request message (a Non-Access Stratum message) to the MME with a 'CSFB indicator'. In the case of a mobile originated (MO) call while the UE is in LTE, the UE sends the Extended Service Request message to the MME with a 'CSFB indicator'.
2. In order to send this Non-Access Stratum (NAS) message to the MME, the UE first establishes a Radio Resource Control (RRC) connection as illustrated in FIG. 1 by sending a RRC Connection Request to the LTE eNodeB. The eNodeB responds to this message with an RRC Connection Setup message. The NAS Extended Service Request message is included in the next message sent by the UE: the RRC Connection Setup Complete message. The eNB forwards the NAS Extended Service Request message transparently to the MME over an S1 connection. In response to this message, the MME sends an S1 AP message to the eNodeB containing the 'CSFB indicator'. The whole procedure may take up to around 150 ms [T1].

As illustrated in FIG. 1, the eNodeB sends an RRC Connection Release message to the UE with information about the carrier frequency(ies) on which it should preferentially search for a suitable cell. On receiving this message, the UE releases the established RRC Connection in LTE and goes to RRC IDLE mode. This RRC Connection Release procedure can take up to 50 ms [T2].

Once in RRC IDLE mode, the UE tunes its radio to the target RAT. For GERAN, UE searches for all of the GERAN Broadcast Control Channel (BCCH) carrier frequencies provided in the LTE RRC Connection Release message. If the list of BCCH carrier frequencies was not provided, the UE can take up to 594 ms [T3] to locate a GERAN cell.

Before the UE can access any chosen cell of the CS supporting RAT, it has to acquire the cell's system information. Taking GERAN as an example RAT again, a crude mobile implementation would have to read the "full BCCH" taking eight 51 frame multiframes (=1880 ms) while a more-sophisticated non-DTM mobile would only need SI 3 and SI 1 (probably incurring a uniform random delay of about 2 to 8 multiframes, e.g. an average of about 1185 ms (Assuming that SI13 is sent in on the BCCH and SI 1 is only sent once every 8 multiframes). The time taken in acquiring the GERAN System Information is therefore a significant contribution to the CSFB delay and can take up to 2 seconds [T4].

3. Once the UE has camped on a suitable cell of the target RAT, it will then request for a channel assignment (GERAN) or set up an RRC Connection (UTRAN). For GERAN this can take up to 1 second and for UTRAN this can take up to 750 ms [T5a]. The UE will then initiate the CS call setup procedure with an additional delay between 2 to 5 seconds [T5b].

Hence, the overall call setup delay for a CSFB call can be as high as 8.75 s with up to 2 s required for the UE to acquire the target cell system information in GERAN.

For the UTRAN case, the overall call set up delay for a CSFB call can be up to 7.45 s with up to 1.4 s required for the UE to acquire the target cell system information.

As described above, one of the main delay components with the CSFB procedure using RRC Connection Release with redirection is the time the UE takes to acquire the target cell system information. The extra delay can be up to 2 seconds for GERAN and 1.4 s for UTRAN. Considering that delay for the call setup in the target RAT system is already high, the extra delay for reading the system information of the target cell will increase the overall call setup delay to a value which is detrimental to the user experience.

Figure 2:
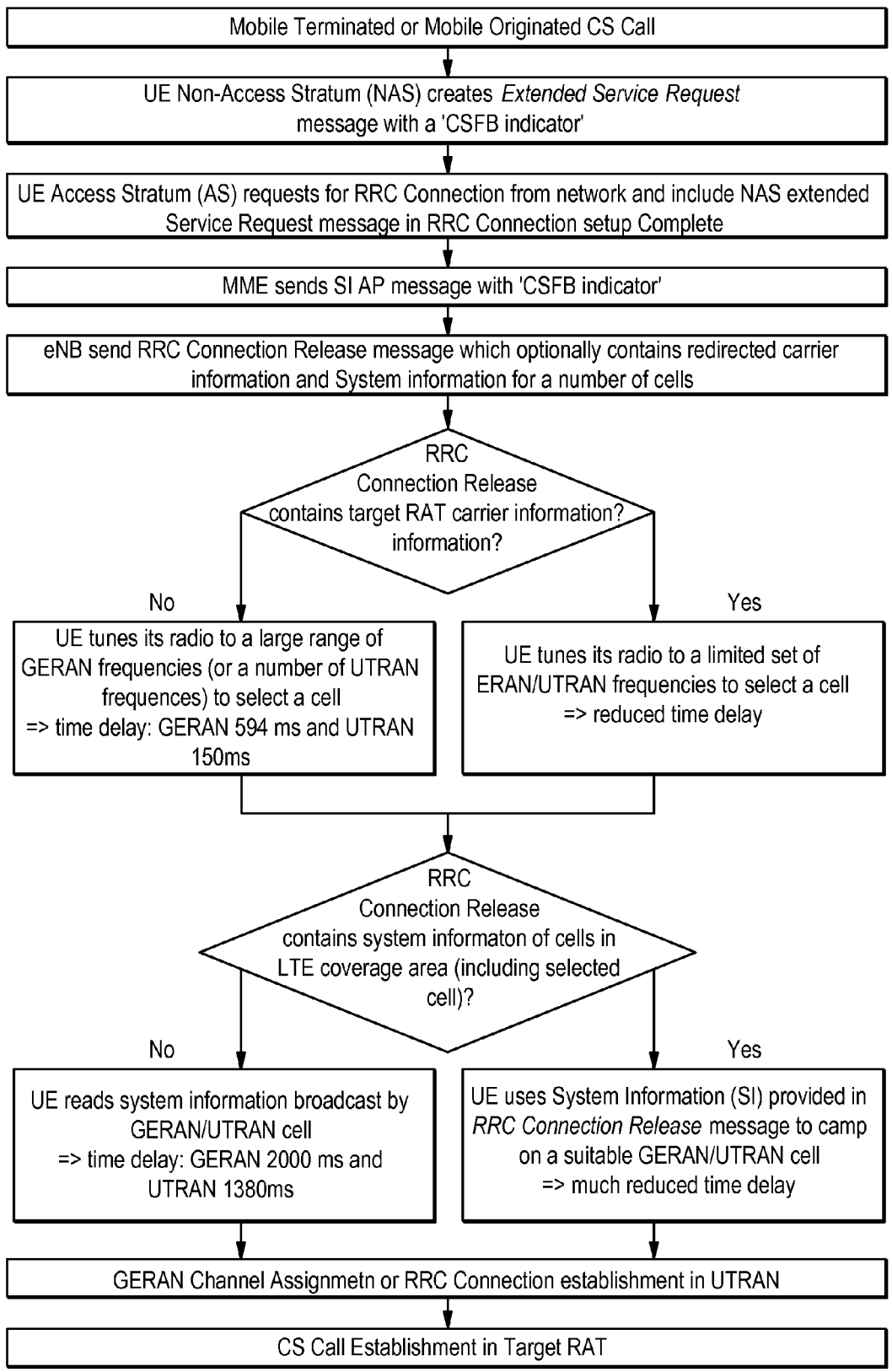
FIG. 2 is a flowchart illustrating UE behaviour depending on whether carrier information for target RAT and/or system information for cells of the target RAT is provided.

S2-100550 describes sending the system information of multiple target cells of the CS supporting RAT to the UE in the RRC Connection Release message, in addition to the information on the carrier information. FIG. 2 illustrates the UE behaviour depending on whether carrier information and system information of cells in the LTE coverage area are provided for the target RAT.

The UE enters RRC Idle mode on receiving the RRC Connection Release message. Hence, the UE is able to choose a suitable cell in the target CS supporting RAT from the carrier frequency list provided in the RRC Connection Release message. This cell does not have to be the strongest cell. By exploiting the received system information of multiple cells from the eNodeB, the UE can prioritise the search for cells for which system information has been provided.

With respect to the RRC Connection Release procedure, the UE does not need to acquire the system information of the selected target cell before accessing it which significantly reduces the call setup delay.

Figure 3:
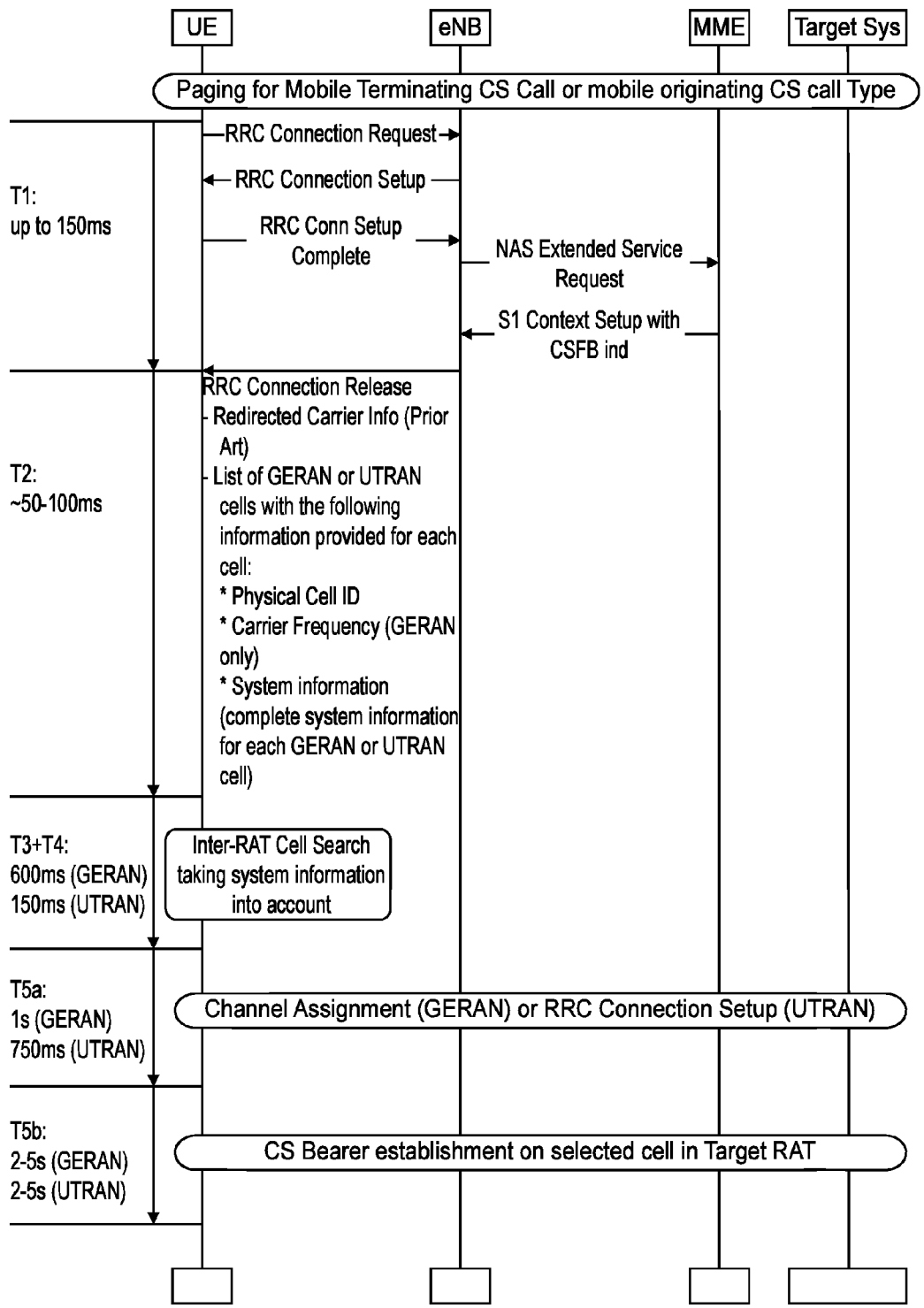
FIG. 3 is a message flow diagram illustrating the additional information provided in RRC Connection Release for the case of CS Fallback to GERAN or UTRAN according to the method of the S2-100550 written contribution, showing the foreseen reduction in call setup delay for each RAT.

FIG. 3 illustrates the additional information which is provided for GERAN or UTRAN according to the method of the S2-100550 written contribution and how the overall call setup delay is affected. It is noted that the time to send the RRC Connection Release message with system information of multiple cells can potentially increase if the data is sent in several transport blocks (depending on the LTE system bandwidth). However, the increase is likely to be much less than the time required to acquire system information of the target cell.

Requiring the RRC Connection Release message to incorporate system information for multiple (GERAN/UTRAN) cells is useful in aligning the tracking area boundaries with the location area boundaries of the "target RAT".

Section 4.2 of the S2-100550 written contribution describes the use of counters within the eNodeB to aid the process of aligning the tracking area boundaries. Specifically, it is suggested that counters be maintained in eNode Bs (eNB) of the most frequently received LAIs (i.e. received in the system information incorporated within the RRC Connection Release message) and that the eNBs supply this count information to the Operations & Maintenance (O+M) centre, where a table maps E-UTRAN cell ID to location codes for CSFB. However, the implementation of these location code counters itself poses new problems.

The eNodeB can determine the identities of Location Areas previously encountered by E-UTRAN attached UEs in any E-UTRAN cell. When each UE attached to E-UTRAN performs a Tracking Area Update the LAC is transferred to the eNodeB as part of the LAI within the Routeing Area ID (RAI)—which is itself within the Globally Unique MME Identifier (GUMMEI). If the LACs are collected over a suitable time period (e.g. up to and including 24 hours), and collated as a table of frequency of occurrence versus each of the 65,534 allowed LACs, the most likely Location Area that overlaps the E-UTRAN cell can be determined, as this will be the most frequent.

However, as an eNodeB does not know how many location areas may be indicated by the UEs performing inter-RAT Tracking Area Updates/Attaches. This can be particularly problematic at borders/airports where large numbers of different 'last visited LAIs' can be received within the RRC signalling messages from the different mobiles. In addition, it is important that the eNodeB counters react swiftly to any changes of the underlying 2G/3G coverage/cell/LA planning/configuration (e.g. if the 2G LA boundary is moved, then the hourly statistics from the eNodeB should reflect this.)

In other words, in E-UTRAN cells containing relatively high proportions of inbound roamers from other countries, or where network sharing or national roaming is allowed, LACs identical to some allocated in the serving network may be encountered, but these will have been assigned by a mobile network in a different country, or by a different mobile network in the same country as the serving network. Thus the LAC may be the same, but the MCC and/or MCC parts of the LAI will differ.

This leads to the likelihood that the eNodeB needs to dimension software/hardware resources for one counter for each Location Area.

However, there are up to 216 Location Areas per network, and, the need to accommodate some national roaming scenarios (where one PLMN is effectively using more than one MNC) and "trans border operator groups" means that the eNodeB might need one counter for every LAI—e.g. for up to (1 million*216) (as MNC and MCC are both potentially 3 digit numbers). This amounts to an excessive number of counters!

To address the problem, it is proposed that the eNodeB implements a two counter process. An example of such a process is explained in more detail below:

Stage 1

The eNodeB is provided with a first 8 bit counter for each Location Area Code (LAC). Whenever the eNode B receives an LAI in the RRC signalling, it checks, then conditionally increments, the counter for that LAC. Thus, if the counter is below a predefined threshold (e.g. 64, 100, 127, or 255) the counter is incremented: if however the counter is equal to the threshold then the counter is not changed, but the eNodeB moves onto stage 2.

Stage 2

The eNodeB examines the whole LAI (not just the LAC) and creates/increments a second (stage 2) counter for that LAI.

Stage 3

At the end of the reporting period, the stage 2 counters having the highest count (the top 16 counters, say) are reported to the O+M system.

By taking this approach, only 64 kbytes of memory need be allocated for the stage 1 counters. Meanwhile the number of stage 2 counters can be expected to be relatively small.

In other words, upper thresholds are set for the LAC counters (the first counters): typically these limits will be set based on binary multiples (e.g. 65, 127, 255 etc). If individual counters for the most frequent LACs reach their threshold within the collection period the full LAI will be captured (using the second counters) and a table of these LAIs versus frequency of occurrence compiled and reported to the Network Management system. The operator can then use manual means, or software applications, to validate the LAIs allocated by his own (serving) network, as these are the only ones relevant to the issue at hand.

By these mechanisms the operator can predict which Location Area within his own network to use when UEs fallback to his CS network from E-UTRAN using the Circuit Switched Fallback mechanism as described in 3GPP TS23.272, without the need to re-measure the 2G CS radio environment during that CSFB process.

In this way, the solution resolves airport situations (or the like) where home network-LAC can get confused with inbound roamers' LAC: e.g. roamers leaving France with LAC=11 entering Germany and users on German home network also with LAC=11.

In addition, the solution can scale according to current requirements.

The invention claimed is:

1. A method for assigning a location area to a mobile device in fallback from a first radio access network to a second radio access network, the location area being selected from a plurality of location areas, each corresponding to a separate location area code (LAC), the first radio access network comprising a base station node having a respective first counter corresponding to each LAC, the method comprising:
   receiving, by the base station node, a signal incorporating one of the LACs and further identifying data corresponding to the second radio access network;
   comparing the first counter corresponding to the one LAC with a predefined threshold value and if the first counter corresponding to the one LAC is less than the predefined threshold value, incrementing the first counter corresponding to the one LAC, otherwise incrementing a second counter corresponding to a unique combination of the one LAC and the further identifying data; and
   reporting, at a predetermined interval, the count from the second counter to the first radio access network.

2. The method recited in claim 1, wherein the first radio access network is a Long-Term Evolution (LTE) network and the second radio access network is a GSM/EDGE Radio Access Network (GERAN).

3. The method recited in claim 1, wherein the first radio access network is an LTE network and the second radio access network is a Universal Terrestrial Radio Access Network (UTRAN).

4. The method recited in claim 1, further comprising providing the second counter before incrementing the second counter if the second counter does not exist.

5. A base station node arranged to implement the method recited in claim 1.

6. The method recited in claim 1, wherein the predefined threshold value is one of 64, 100, 127, and 255.

7. A method for assigning location areas to mobile devices in fallback from a first radio access network to a second radio access network, the location areas being selected from a plurality of location areas, each corresponding to a separate location area code (LAC), the first radio access network comprising a base station node having a respective first counter corresponding to each LAC, the method comprising:
   receiving, by the base station node, a plurality of signals, each incorporating one of the LACs and further identifying data corresponding to the second radio access network;
   for each received signal, comparing the first counter corresponding to the LAC of the received signal with a predefined threshold value and if the first counter is less than the predefined threshold value, incrementing the first counter, otherwise incrementing a second counter corresponding to a unique combination of the LAC of the received signal and the further identifying data; and
   reporting, at a predetermined interval, the count from the second counters to the first radio access network.

8. The method recited in claim 7, further comprising, for each received signal, providing the second counter before incrementing the second counter if the second counter does not exist.

9. The method recited in claim 7, wherein reporting the count from the second counters to the first radio access network comprises reporting a subset of the second counters to the first radio access network, the subset representing the second counters having the highest counts over the reporting period.

10. The method recited in claim 7, wherein the predefined threshold value is one of 64, 100, 127, and 255.

11. A base station node arranged to implement the method recited in claim 7.

12. A base station node comprising:
   a plurality of first counters, each corresponding to a separate location area code (LAC);
   one or more second counters, each corresponding to a unique combination of one of the LACs and further identifying data corresponding to a radio access network, the first and second counters being configured to be used as follows:
      whenever the base station node receives a signal incorporating a LAC and further identifying data, the first counter corresponding to the LAC is compared to a predefined threshold value and if the first counter corresponding to the LAC is less than the predefined threshold value, the first counter is incremented, otherwise, the second counter corresponding to the unique combination of the LAC and the further identifying data is incremented;
      at a predetermined interval, the count from the second counters are reported to the radio access network.

13. The base station node recited in claim 12, wherein each of the second counters is created after the first counter corresponding to the corresponding LAC has reached the predefined threshold value.

14. The method recited in claim 12, wherein the predefined threshold value is one of 64, 100, 127, and 255.

* * * * *